(12) United States Patent
Zhao et al.

(10) Patent No.: US 11,675,796 B2
(45) Date of Patent: Jun. 13, 2023

(54) METHOD AND APPARATUS FOR METADATA OF FUNCTION AND FUNCTION GROUP SEARCH IN MOVING PICTURE EXPERTS GROUP NETWORK BASED MEDIA PROCESSING

(71) Applicant: TENCENT AMERICA LLC, Palo Alto, CA (US)

(72) Inventors: Shuai Zhao, Pleasanton, CA (US); Iraj Sodagar, Los Angeles, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 288 days.

(21) Appl. No.: 16/851,431

(22) Filed: Apr. 17, 2020

(65) Prior Publication Data

US 2020/0341989 A1    Oct. 29, 2020

Related U.S. Application Data

(60) Provisional application No. 62/839,603, filed on Apr. 26, 2019.

(51) Int. Cl.
*G06F 16/2457* (2019.01)
*G06F 16/435* (2019.01)
*H04N 21/234* (2011.01)
*H04L 67/10* (2022.01)

(52) U.S. Cl.
CPC ...... *G06F 16/24578* (2019.01); *G06F 16/435* (2019.01); *H04N 21/234* (2013.01); *H04L 67/10* (2013.01)

(58) Field of Classification Search
CPC ............ G06F 16/24578; G06F 16/435; H04N 21/234; H04L 67/10
See application file for complete search history.

(56) References Cited

U.S. PATENT DOCUMENTS 7,962,470 B2 *  6/2011  Degenkolb ........... G06F 16/972
                                                            709/229
9,888,093 B2 *  2/2018  Heuer ..................... H04L 67/42

OTHER PUBLICATIONS

Inoue, Katsuro, et al. "Ranking significance of software components based on use relations." IEEE Transactions on Software Engineering 31.3 (2005): 213-225. (Year: 2005).*

(Continued)

*Primary Examiner* — Jay A Morrison
(74) *Attorney, Agent, or Firm* — Sughrue Mion, PLLC

(57) ABSTRACT

A method of processing media content in Moving Picture Experts Group (MPEG) Network Based Media Processing (NBMP) is performed by at least one processor, and includes performing a function and function group discovery, wherein wildcard search is enabled in the function and function group discovery, transmitting, to a function repository storing one or more functions for processing the media content, a search query for at least one among the one or more functions, based on the search query being transmitted, receiving, from the function repository, a reply identifying the at least one among the one or more functions and including a rank of the at least one among the one or more functions, and processing the media content, using the identified at least one among the one or more functions in an order based on the included rank of the at least one among the one or more functions.

16 Claims, 5 Drawing Sheets

(56) References Cited

OTHER PUBLICATIONS

Systems, "Potential enhancements for Network-based Media Processing", International Organisation for Standardisation, Mar. 29, 2019, ISO/IEC JTC1/SC29/WG11, N18401 pp. 1-106 (total 116 pages).

* cited by examiner

METHOD AND APPARATUS FOR METADATA OF FUNCTION AND FUNCTION GROUP SEARCH IN MOVING PICTURE EXPERTS GROUP NETWORK BASED MEDIA PROCESSING

CROSS-REFERENCE TO RELATED APPLICATION

This application claims priority from U.S. Provisional Patent Application No. 62/839,603, filed on Apr. 26, 2019, in the U.S. Patent and Trademark Office, the disclosure of which is incorporated herein by reference in its entirety.

BACKGROUND

The Moving Picture Experts Group (MPEG) Network Based Media Processing (NBMP) project has developed a concept of processing media on cloud. However, current NBMP design does not provide an application program interface (API) abstraction for network management. Current NBMP design only provides APIs for cloud resources such as a hardware platform.

Further, in NBMP, current response parameters are not well-defined. When multiple entries are returned from a function repository, a source or an NBMP manager may make a decision between the returned entries. For example, if the source makes such a decision, then it might be easy because the source can read the returned multiple entries and perform a manual selection. However even in this case, the source might have a hard time selecting a correct function from the returned multiple entries. In another example, if the NBMP manager makes the decision after parsing a NBMP Workflow Description Document (WDD) from the source and reading the returned multiple entries, the NBMP manager may need some reference point to make the decision.

SUMMARY

According to embodiments, a method of processing media content in Moving Picture Experts Group (MPEG) Network Based Media Processing (NBMP) is performed by at least one processor, and includes performing a function and function group discovery, wherein wildcard search is enabled in the function and function group discovery, transmitting, to a function repository storing one or more functions for processing the media content, a search query for at least one among the one or more functions, based on the search query being transmitted, receiving, from the function repository, a reply identifying the at least one among the one or more functions and including a rank of the at least one among the one or more functions, and processing the media content, using the identified at least one among the one or more functions in an order based on the included rank of the at least one among the one or more functions.

According to embodiments, an apparatus for processing media content in Moving Picture Experts Group (MPEG) Network Based Media Processing (NBMP) includes at least one memory configured to store program code, and at least one processor configured to read the program code and operate as instructed by the program code, the program code including performing code configured to cause the at least one processor to perform a function and function group discovery, wherein wildcard search is enabled in the function and function group discovery, transmitting code configured to cause the at least one processor to transmit, to a function repository storing one or more functions for processing the media content, a search query for at least one among the one or more functions, receiving code configured to cause the at least one processor to, based on the search query being transmitted, receive, from the function repository, a reply identifying the at least one among the one or more functions and including a rank of the at least one among the one or more functions, and processing code configured to cause the at least one processor to process the media content, using the identified at least one among the one or more functions in an order based on the included rank of the at least one among the one or more functions.

A non-transitory computer-readable medium stores instructions that, when executed by at least one processor of an apparatus for processing media content in Moving Picture Experts Group (MPEG) Network Based Media Processing (NBMP), cause the at least one processor to perform a function and function group discovery, wherein wildcard search is enabled in the function and function group discovery, transmit, to a function repository storing one or more functions for processing the media content, a search query for at least one among the one or more functions, based on the search query being transmitted, receive, from the function repository, a reply identifying the at least one among the one or more functions and including a rank of the at least one among the one or more functions, and process the media content, using the identified at least one among the one or more functions in an order based on the included rank of the at least one among the one or more functions.

DETAILED DESCRIPTION

A NBMP function is defined by a current NBMP committee draft, and is searchable from a function repository that could reside anywhere in a network, for example, in a local data center or a remote one. The NBMP committee draft defines how a source device or an NBMP manager searches for available functions in the network by using function keyword(s) that are passed to a function discovery API.

Embodiments described herein provide a data format of a function discovery API operation, and include a function return parameter along with a function name and a function identifier (ID).

Figure 1:
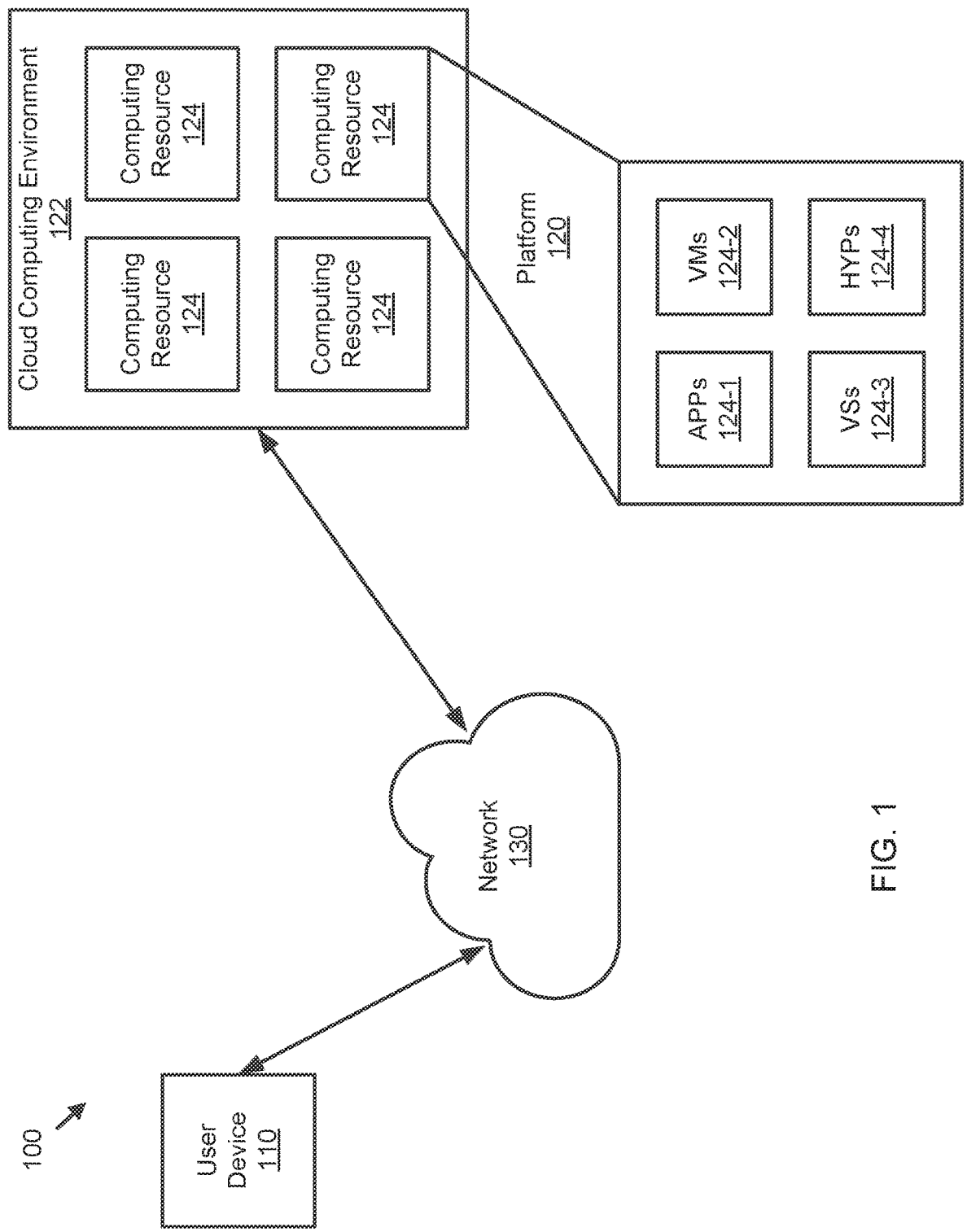
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
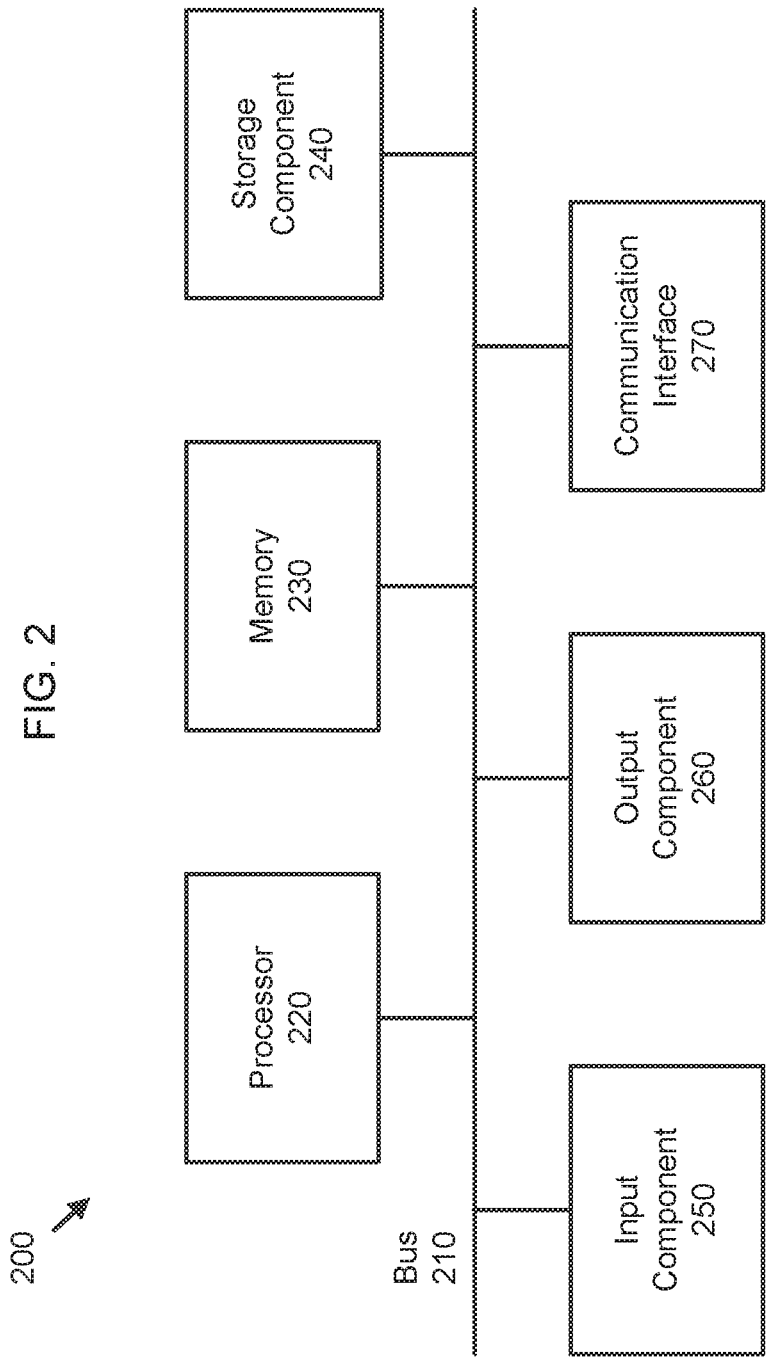
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
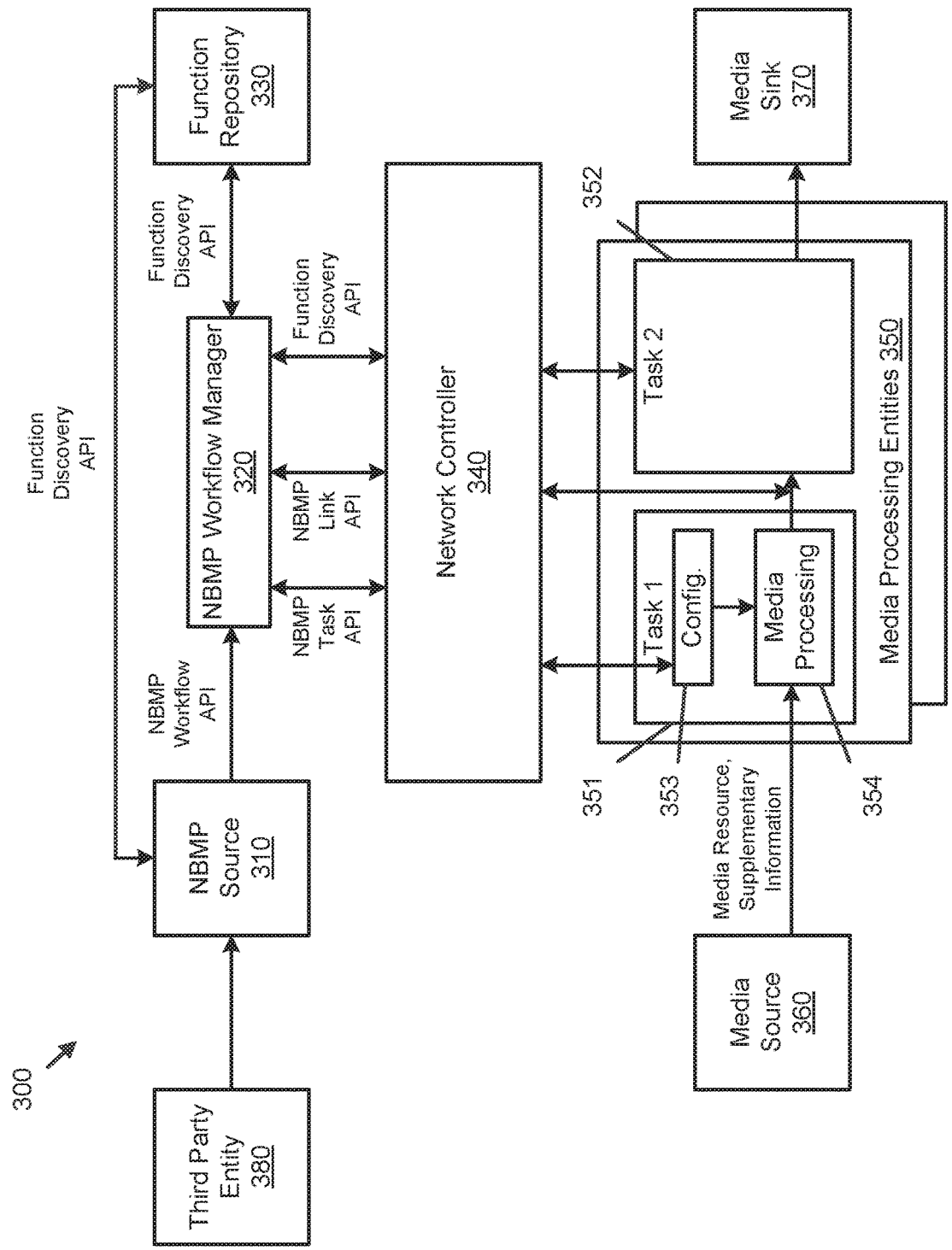
FIG. 3 is a block diagram of an NBMP system, according to embodiments.

FIG. 3 is a block diagram of an NBMP system 300, according to embodiments.

Referring to FIG. 3, the NBMP system 300 includes an NBMP source 310, an NBMP workflow manager 320, a function repository 330, a network controller 340, one or more media processing entities 350, a media source 360, and a media sink 370.

The NBMP source 310 may receive instructions from a third party entity 380, may communicate with the NBMP workflow manager 320 via an NBMP workflow API, and may communicate with the function repository 330 via a function discovery API. For example, the NBMP source 310 may send a workflow description document to the NBMP workflow manager 320, and may read a function description of functions that are stored in a memory of the function repository 330. The functions may include media processing functions such as, for example, functions of media decoding, feature point extraction, camera parameter extraction, projection method, seam information extraction, blending, post-processing, and encoding. The NBMP source 310 may include at least one processor and a memory that stores code configured to cause the at least processor to perform functions of the NBMP source 310.

The NBMP source 310 may request the NBMP workflow manager 320 to create workflow including tasks 351 and 352 to be performed by the one or more media processing entities 350, by sending the workflow description document to the NBMP workflow manager 320. The workflow description document may include descriptors, each of which may include parameters.

For example, the NBMP source 310 may select one or more of the functions stored in the function repository 330, and send, to the NBMP workflow manager 320, the workflow description document including the descriptors for describing details such as input and output data, the selected one or more of the functions, and requirements for a workflow. The workflow description document may further include a set of task descriptions and a connection map of inputs and outputs of the tasks 351 and 352 to be performed by the one or more of the media processing entities 350. When the NBMP workflow manager 320 receives such information from the NBMP source 310, the NBMP workflow manager 320 may create the workflow by instantiating the tasks 351 and 352 based on function names and connecting the tasks 351 and 352 in accordance with the connection map.

Alternatively or additionally, the NBMP source 310 may request the NBMP workflow manager 320 to create a workflow by using a set of keywords. For example, the NBMP source 310 may send, to the NBMP workflow manager 320, the workflow description document including the set of the keywords that the NBMP workflow manager 320 may use to find appropriate one or more of the functions stored in the function repository 330. When the NBMP workflow manager 320 receives such information from the NBMP source 310, the NBMP workflow manager 320 may create the workflow by searching for the appropriate one or more of the functions, using the keywords that may be specified in a Processing Descriptor of the workflow description document, and by using other descriptors in the workflow description document to provision and connect the tasks 351 and 352.

The NBMP workflow manager 320 may communicate with the function repository 330 via a function discovery API, and may communicate with one or more of the media processing entities 350, through the network controller 340, via an NBMP task API, an NBMP link API, and a function discovery API. The NBMP workflow manager 320 may include at least one processor and a memory that stores code configured to cause the at least processor to perform functions of the NBMP workflow manager 320.

The NBMP workflow manager 320 may use the NBMP task API to setup, configure, manage, and monitor one or more of the tasks 351 and 352 of the workflow that is performable by the one or more media processing entities 350. In embodiments, the NBMP workflow manager 320 may use the NBMP task API to update and destroy the tasks 351 and 352. To configure, manage, and monitor the tasks 351 and 352 of the workflow, the NBMP workflow manager 320 may send messages, such as requests, to one or more of the media processing entities 350, wherein each message may have descriptors, each of which may include parameters. The tasks 351 and 352 may each include one or more media processing functions 354 and one or more configurations 353 for the one or more media processing functions 354.

In embodiments, after receiving the workflow description document from the NBMP source 310 that does not include a list of tasks (e.g., includes a list of keywords instead of a list of tasks), the NBMP workflow manager 320 may select the tasks based on descriptions of the tasks in the workflow description document, to search the function repository 330, via the function discovery API, to find appropriate one or more of the functions to run as the tasks 351 and 352 for the current workflow. For example, the NBMP workflow manager 320 may select the tasks based on keywords that are provided in the workflow description document. After the appropriate one or more of the functions are identified using the keywords or the set of task descriptions that is provided by the NBMP source 310, the NBMP workflow manager 320 may configure the selected tasks in the workflow by using the NBMP task API. For example, the NBMP workflow manager 320 may extract configuration data from information that is received from the NBMP source, and configure the tasks 351 and 352 based on the extracted configuration data.

The one or more media processing entities 350 may be configured to receive media content from the media source 360, process the received media content in accordance with the workflow that includes the tasks 351 and 352 and is created by the NBMP workflow manager 320, and output the processed media content to the media sink 370. The one or more media processing entities 350 may each include at least one processor and a memory that stores code configured to cause the at least processor to perform functions of the one or more media processing entities 350.

The network controller 340 may include at least one processor and a memory that stores code configured to cause the at least processor to perform functions of the network controller 340.

The media source 360 may include memory that stores media and may be integrated with or separate from the NBMP source 310. In embodiments, the NBMP workflow manager 320 may notify the NBMP source 310 and/or the media source 360 when a workflow is prepared, and the media source 360 may transmit media content to the one or more of the media processing entities 350 based on a notification that the workflow is prepared.

The media sink 370 may include at least one processor and at least one display that is configured to display media content that is processed by the one or more media processing entities 350.

The third party entity 380 may include at least one processor and a memory that stores code configured to cause the at least processor to perform functions of the third party entity 380.

As discussed above, messages from the NBMP source 310 (e.g. a workflow description document for requesting creation of a workflow) to the NBMP workflow manager 320, and messages (e.g. for causing the workflow to be performed) from the NBMP workflow manager 320 to the one or more media processing entities 350 may include descriptors, each of which including parameters. In embodiments, communication between any of components of the NBMP system 300 using an API may include descriptors, each of which including parameters.

Table 1 below lists details of metadata that is added to the NBMP system 300 described above, namely, a function name, a function group name, a function ID and/or a function group ID for each function stored in the function repository 330. The added metadata allows for wildcard search (e.g., a text-based keyword search) of the functions and/or function groups including multiple functions. In the wildcard search, an asterisk sign * represents any characters including 0, and a question mark sign ? represents only one character.

TABLE 1

| Properties | Parameter Options | Description | Data Type |
|---|---|---|---|
| Function or Function Group Name | Mandatory | String indicating which functions can be searched Supports the following wildcard search: (*) represents any number of characters (0 or 1+) (?) represents one character For example, ffm* returns any functions with a prefix "ffm" | String |
| Function or Function Group ID | Mandatory | Unique identification of each function or function group ID configured in NBMP manager ID is unique among all functions and function groups, various versions and tags (release numbers) of functions | String |

The function group name may be a string description of a group of functions, e.g., "HEVC decoder."

Further, a rank parameter for each function is added to a current NBMP general descriptor. A higher ranking for a function means a better choice, in the sense that the function is probably a popular function that is often used by others. The function repository 330 assigns a value of the rank parameter to each function, by following a principle ranking order of functions. The ranking order may be determined based on popularity scoring, which may be determined by a search engine based on a number of uses of each function. A definition of the ranking parameter is in Table 2 below.

TABLE 2

| Parameter Name | Description | Data Type |
| --- | --- | --- |
| Rank | Provides an unsigned integer indicating ranking order among functions or function groups with same or similar functionality. A higher number indicates a higher rank | Number |

A function return data format or parameters are defined in Table 3 below. The function return data format includes a Universal Resource Locator (URL) of one of the functions stored in the function repository 330 and a rank parameter of the one of the functions.

TABLE 3

| Parameters | Parameter Options | Description | Data Type |
| --- | --- | --- | --- |
| url | Mandatory | URL of function implementation | String (URL format) |
| rank | Optional | Ranking of function | Number |

Referring to FIG. 3, the NBMP source 310 and/or the NBMP workflow manager 320 may transmit a search query (described in Table 1) to the function repository 330, and in response to the search query, the function repository 330 transmits a reply having the function return data format (described in Tables 2 and 3) to the NBMP source 310 and/or the NBMP workflow manager 320. For example, the search query may include an ID, a name and a text-based description or keyword (e.g., a brand) of a function.

Uses cases for the added function return data parameters are described as follows. If only one function is returned by the function repository 330, because there is only one version of the function available at the function repository 330, the function return data parameters would be as follows, in which there is no ranking:

| Name | Id | Description | Rank | url |
| --- | --- | --- | --- | --- |
| ffmpeg | x.x.x | ffmpeg official tool | | http://xxx.yyy.com/ffmpeg-v0 |

If multiple functions are returned by the function repository 330, because there are multiple versions of the function available at the function repository 330, the function return data parameters would be as follows, in which there is a ranking of the functions:

| Name | Id | Description | Rank | url |
| --- | --- | --- | --- | --- |
| ffmpeg | x.x.1 | ffmpeg version x.x.1 | 10 | http://xxx.yyy.com/ffmpeg-v1 |
| ffmpeg | x.x.2 | ffmpeg version x.x.2 | 8 | http://xxx.yyy.com/ffmpeg-v2 |

In this use case, the NBMP workflow manager 320 would enable performance of a function x.x.1 having a rank higher than that of a function x.x.2, before performance of the function x.x.2.

The response parameter with added "rank" descriptor can be presented using a JavaScript Object Notation (JSON) return schema as shown below:

```
{
  "function-name": {
    "type": "string"
  },
  "function-id": {
    "type": "string"
  },
  "function-description": {
    "type": "string"
  }
  "rank": {
    "type": "integer"
  }
  "url": {
    "type": "string"
  }
}
```

Figure 4:
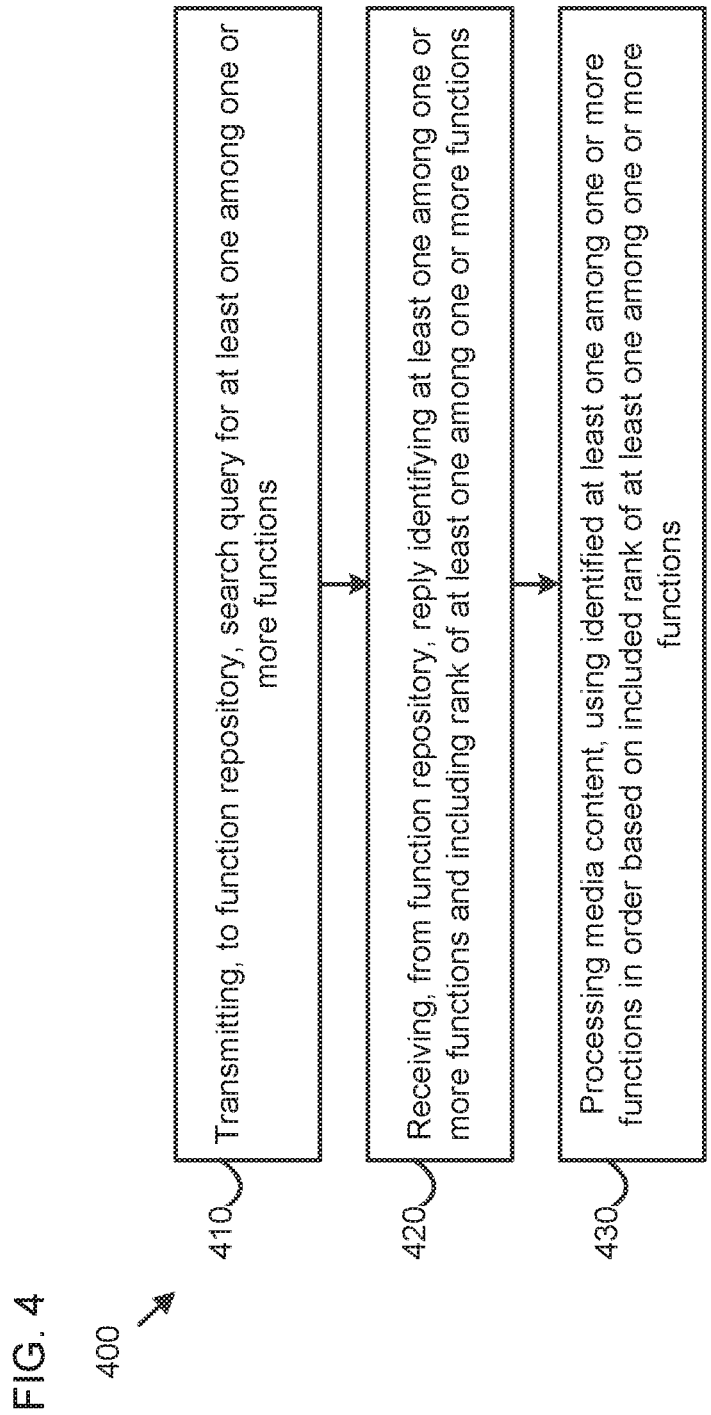
FIG. 4 is a flowchart of a method of processing media content in MPEG NBMP, according to embodiments.

FIG. 4 is a flowchart of a method 400 of processing media content in MPEG NBMP, according to embodiments. In some implementations, one or more process blocks of FIG. 4 may be performed by the platform 120 implementing the NBMP system 300. In some implementations, one or more process blocks of FIG. 4 may be performed by another device or a group of devices separate from or including the platform 120 implementing the NBMP system 300, such as the user device 110.

As shown in FIG. 4, in operation 410, the method 400 includes transmitting, to a function repository storing one or more functions for processing the media content, a search query for at least one among the one or more functions. Further, the method 400 may perform a function and function group discovery, wherein wildcard search is enabled in the function and function group discovery.

In operation 420, the method 400 includes, based on the search query being transmitted, receiving, from the function repository, a reply identifying the at least one among the one or more functions and including a rank of the at least one among the one or more functions.

In operation 430, the method 400 includes processing the media content, using the identified at least one among the one or more functions in an order based on the included rank of the at least one among the one or more functions.

The search query may include a name and an identifier of the at least one among the one or more functions or a group including the at least one among the one or more functions.

The search query may include a text-based description or a keyword of the at least one among the one or more functions.

The search query may be configured to include an asterisk representing any character, and a question mark representing only one character.

The reply may further include a Universal Resource Locator (URL) of the at least one among the one or more functions.

The rank may indicate how often the at least one among the one or more functions in comparison to others among the one or more functions.

The media content may be processed using a first function having a higher rank before a second function having a lower rank, among the identified at least one among the one or more functions.

Although FIG. 4 shows example blocks of the method 400, in some implementations, the method 400 may include additional blocks, fewer blocks, different blocks, or differently arranged blocks than those depicted in FIG. 4. Additionally, or alternatively, two or more of the blocks of the method 400 may be performed in parallel.

Figure 5:
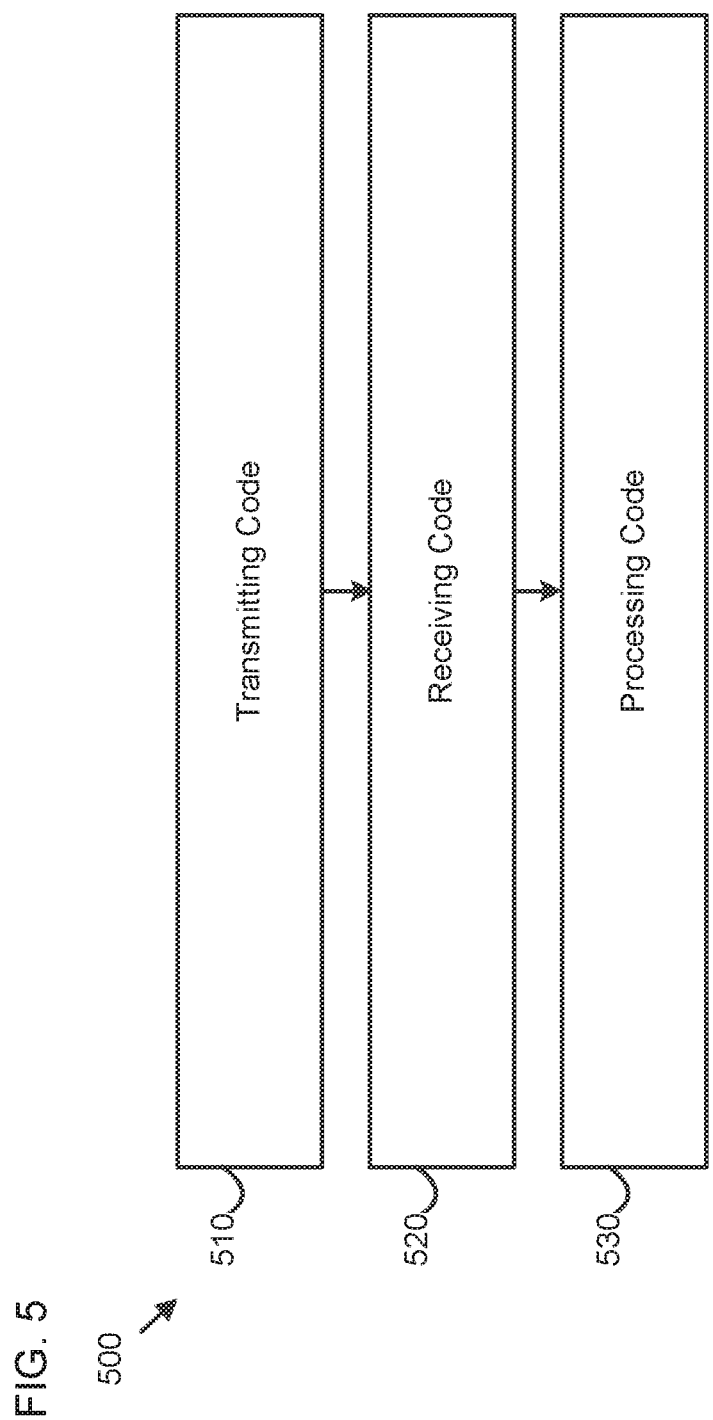
FIG. 5 is a block diagram of an apparatus for processing media content in MPEG NBMP, according to embodiments.

FIG. 5 is a diagram of an apparatus 500 for processing media content in MPEG NBMP, according to embodiments. As shown in FIG. 5, the apparatus 500 includes transmitting code 510, receiving code 520 and processing code 530.

The transmitting code 510 is configured to cause at least one processor to transmit, to a function repository storing one or more functions for processing the media content, a search query for at least one among the one or more functions.

The receiving code 520 is configured to cause the at least one processor to, based on the search query being transmitted, receive, from the function repository, a reply identifying the at least one among the one or more functions and including a rank of the at least one among the one or more functions.

The processing code 530 is configured to cause the at least one processor to perform a function and function group discovery, wherein wildcard search is enabled in the function and function group discovery; and to process the media content, using the identified at least one among the one or more functions in an order based on the included rank of the at least one among the one or more functions.

The search query may include a name and an identifier of the at least one among the one or more functions or a group including the at least one among the one or more functions.

The search query may include a text-based description or a keyword of the at least one among the one or more functions.

The search query may be configured to include an asterisk representing any character, and a question mark representing only one character.

The reply may further include a Universal Resource Locator (URL) of the at least one among the one or more functions.

The rank may indicate how often the at least one among the one or more functions in comparison to others among the one or more functions.

The media content may be processed using a first function having a higher rank before a second function having a lower rank, among the identified at least one among the one or more functions.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of processing media content in Moving Picture Experts Group (MPEG) Network Based Media Processing (NBMP), the method being performed by at least one processor, and the method comprising:
  performing a function and function group discovery, wherein wildcard search is enabled in the function and function group discovery;
  transmitting, to a function repository storing two or more functions for processing the media content, a search query for at least one among the two or more functions;
  based on the search query being transmitted, receiving, from the function repository, a reply identifying the at least one among the two or more functions and comprising a rank of the at least one among the two or more functions, wherein the rank indicates a frequency with which the at least one among the two or more functions is used in comparison to others among the two or more functions having a same functionality as the at least one among the two or more functions; and
  processing the media content, using the identified at least one among the two or more functions in an order based on the comprised rank of the at least one among the two or more functions.

2. The method of claim 1, wherein the search query comprises a name and an identifier of the at least one among the two or more functions or a group comprising the at least one among the two or more functions.

3. The method of claim 1, wherein the search query comprises a text-based description or a keyword of the at least one among the two or more functions.

4. The method of claim 1, wherein the search query is configured to comprise an asterisk representing any character.

5. The method of claim 1, wherein the media content is processed using a first function having a higher rank before a second function having a lower rank, among the identified at least one among the two or more functions.

6. An apparatus for processing media content in Moving Picture Experts Group (MPEG) Network Based Media Processing (NBMP), the apparatus comprising:
  at least one memory configured to store program code; and at least one processor configured to read the program code and operate as instructed by the program code, the program code comprising:

performing code configured to cause the at least one processor to perform a function and function group discovery, wherein wildcard search is enabled in the function and function group discovery;

transmitting code configured to cause the at least one processor to transmit, to a function repository storing two or more functions for processing the media content, a search query for at least one among the two or more functions;

receiving code configured to cause the at least one processor to, based on the search query being transmitted, receive, from the function repository, a reply identifying the at least one among the two or more functions and comprising a rank of the at least one among the two or more functions, wherein the rank indicates a frequency with which the at least one among the two or more functions is used in comparison to others among the two or more functions having a same functionality as the at least one among the two or more functions; and processing code configured to cause the at least one processor to process the media content, using the identified at least one among the two or more functions in an order based on the comprised rank of the at least one among the two or more functions.

7. The apparatus of claim 6, wherein the search query comprises a name and an identifier of the at least one among the two or more functions or a group comprising the at least one among the two or more functions.

8. The apparatus of claim 6, wherein the search query comprises a text-based description or a keyword of the at least one among the two or more functions.

9. The apparatus of claim 6, wherein the search query is configured to comprise an asterisk representing any character, and a question mark representing only one character.

10. The apparatus of claim 6, wherein the reply further comprises a Universal Resource Locator (URL) of the at least one among the two or more functions.

11. The apparatus of claim 6, wherein the media content is processed using a first function having a higher rank before a second function having a lower rank, among the identified at least one among the two or more functions.

12. A non-transitory computer-readable medium storing instructions that, when executed by at least one processor of an apparatus for processing media content in Moving Picture Experts Group (MPEG) Network Based Media Processing (NBMP), cause the at least one processor to:

perform a function and function group discovery, wherein wildcard search is enabled in the function and function group discovery;

transmit, to a function repository storing two or more functions for processing the media content, a search query for at least one among the two or more functions;

based on the search query being transmitted, receive, from the function repository, a reply identifying the at least one among the two or more functions and comprising a rank of the at least one among the two or more functions, wherein the rank indicates a frequency with which the at least one among the two or more functions is used in comparison to others among the two or more functions having a same functionality as the at least one among the two or more functions; and process the media content, using the identified at least one among the two or more functions in an order based on the comprised rank of the at least one among the two or more functions.

13. The non-transitory computer-readable medium of claim 12, wherein the search query comprises a name and an identifier of the at least one among the two or more functions or a group comprising the at least one among the two or more functions.

14. The non-transitory computer-readable medium of claim 12, wherein the search query comprises a text-based description or a keyword of the at least one among the two or more functions.

15. The non-transitory computer-readable medium of claim 12, wherein the search query is configured to comprise an asterisk representing any character, and a question mark representing only one character.

16. The non-transitory computer-readable medium of claim 12, wherein the reply further comprises a Universal Resource Locator (URL) of the at least one among the two or more functions.

* * * * *